US012786552B2

(12) United States Patent
Iwahori

(10) Patent No.: US 12,786,552 B2
(45) Date of Patent: Nov. 3, 2026

(54) INFORMATION PROCESSING APPARATUS CAPABLE OF SMOOTHLY ALLOCATING USER-INTENDED FUNCTION TO OPERATION TERMINAL, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Seishiro Iwahori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 18/816,393

(22) Filed: Aug. 27, 2024

(65) Prior Publication Data

US 2025/0106499 A1 Mar. 27, 2025

(30) Foreign Application Priority Data

Sep. 21, 2023 (JP) ................................. 2023-155922

(51) Int. Cl.
*H04N 23/63* (2023.01)
*G06F 3/01* (2006.01)
(Continued)

(52) U.S. Cl.
CPC ........... *H04N 23/635* (2023.01); *G06F 3/013* (2013.01); *G06T 17/00* (2013.01); *H04N 23/667* (2023.01)

(58) Field of Classification Search
CPC .... H04N 23/635; H04N 23/667; G06F 3/013; G06F 3/011; G06F 3/13; G06T 17/00
See application file for complete search history.

(56) References Cited

U.S. PATENT DOCUMENTS 8,226,484 B2 * 7/2012 Bryant .................. A63F 13/285
463/36
11,761,762 B1 * 9/2023 Ho ........................... G01C 3/08
348/138

(Continued)

FOREIGN PATENT DOCUMENTS

CN 112166602 A * 1/2021 ........... G06F 3/0488
EP 3651441 A1 * 5/2020 ....... H04N 21/43615

(Continued)

*Primary Examiner* — Lin Ye
*Assistant Examiner* — Steven Daniel Barry
(74) *Attorney, Agent, or Firm* — Cowan, Liebowitz & Latman, P.C.

(57) ABSTRACT

An information processing apparatus capable of smoothly allocating a function intended by a user to an operation terminal is provided. The information processing apparatus is communicably connected to an operation terminal including an input unit that performs an input operation for an image of a virtual space and performs a specified function in response to the input operation. The information processing apparatus includes at least one processor and a memory coupled to the processor storing instructions that, when executed by the processor, cause the processor to function as a position obtaining unit that obtains position information relating to a position of the operation terminal, and a changing unit that is capable of changing the function of the input unit to be performed by the input operation in accordance with the position information obtained by the position obtaining unit.

14 Claims, 10 Drawing Sheets

(51) Int. Cl.
*G06T 17/00* (2006.01)
*H04N 23/667* (2023.01)

(56) References Cited

U.S. PATENT DOCUMENTS

| | | | | |
|---|---|---|---|---|
| 2021/0406528 | A1* | 12/2021 | Ramani | G06F 3/011 |
| 2022/0125299 | A1* | 4/2022 | Abou Shousha | A61B 3/024 |

FOREIGN PATENT DOCUMENTS

| | | | | |
|---|---|---|---|---|
| JP | 2016081408 A | | 5/2016 | |
| JP | 2019046291 A | | 3/2019 | |
| JP | 2023031290 A | | 3/2023 | |
| WO | WO-2023166794 A1 | * | 9/2023 | G06T 15/04 |

* cited by examiner

*FIG. 4*

| POSITION INFORMATION | WHETHER OR NOT OPERATION TERMINAL IS LOCATED WITHIN ANGLE-OF-VIEW OF HMD |
|---|---|
| (0、100、100) | ○ |

*FIG. 5A*

FOR PHOTOGRAPHING

| INPUT UNIT | FUNCTION |
|---|---|
| BUTTON A | PHOTOGRAPHING |
| BUTTON B | ZOOMING |
| DIAL A | SETTING CHANGE |
| ... | ... |

*FIG. 5B*

FOR LIVE VIEW PHOTOGRAPHING

| INPUT UNIT | FUNCTION |
|---|---|
| BUTTON A | PHOTOGRAPHING |
| BUTTON B | ZOOMING |
| DIAL A | SETTING CHANGE |
| TOUCH PANEL | PHOTOGRAPHING |
| ... | ... |

*FIG. 5C*

FOR MOVING ANGLE

| INPUT UNIT | FUNCTION |
|---|---|
| BUTTON A | MOVE RIGHT |
| BUTTON B | MOVE LEFT |
| DIAL A | CHANGE ORIENTATION |
| ... | ... |

INFORMATION PROCESSING APPARATUS CAPABLE OF SMOOTHLY ALLOCATING USER-INTENDED FUNCTION TO OPERATION TERMINAL, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium.

Description of the Related Art

In recent years, technological innovation in "virtual reality (VR)" has been remarkable. Along with this technological innovation, VR devices such as a head mounted display (an HMD) are becoming more and more popular. Within a virtual space displayed on the VR device, for example, it is possible to execute or use various contents such as games and photo shooting. In the case of executing or using the content, an operation terminal such as a controller that is operated by hand is used. Japanese Laid-Open Patent Publication (kokai) No. 2023-31290 has disclosed a game system including an HMD and a controller communicably connected to the HMD. In the game system disclosed in Japanese Laid-Open Patent Publication (kokai) No. 2023-31290, a pose of a user who is holding the controller is detected. In addition, as the pose, in the case that a pose, in which the user brings the controller close to his or her face, has been detected, it is possible to display an object on a line extending from the end of the barrel of a weapon the user is holding in a virtual space in a magnified manner. Furthermore, Japanese Laid-Open Patent Publication (kokai) No. 2016-81408 has disclosed that a device other than a dedicated VR controller is capable of being used as a controller for an HMD.

In an HMD, a user may change the position of the user's own avatar in the virtual space by operating a controller while gripping (holding) it. In addition, a camera is also able to being used as a controller. In this case, since the camera is used for photographing, it is necessary to use a controller separate from the camera for changing the avatar position, that is, the user needs to switch between the camera and the separate controller. For this reason, it is desirable that a single controller is capable of performing a variety of functions.

SUMMARY OF THE INVENTION

The present invention provides an information processing apparatus capable of smoothly allocating a function intended by a user to an operation terminal, a control method for the information processing apparatus, and a storage medium.

Accordingly, the present invention provides an information processing apparatus communicably connected to an operation terminal including an input unit that performs an input operation for an image of a virtual space and performs a specified function in response to the input operation, the information processing apparatus comprising one or more processors and/or circuitry configured to execute a position obtaining processing that obtains position information relating to a position of the operation terminal, and execute a changing processing that is capable of changing the function of the input unit to be performed by the input operation in accordance with the position information obtained in the position obtaining processing.

According to the present invention, it is possible to smoothly allocate the function intended by the user to the operation terminal.

Further features of the present invention will become apparent from the following description of exemplary embodiments with reference to the attached drawings.

BRIEF DESCRIPTION OF THE DRAWINGS

FIG. 4 is a diagram that shows an example of data obtained by an operation terminal position information obtaining module of the information processing apparatus.

FIGS. 5A, 5B, and 5C are diagrams that show examples of allocation of functions to an operation unit of the operation terminal according to a determination result obtained by an allocation determining module of the information processing apparatus.

DESCRIPTION OF THE EMBODIMENTS

The present invention will now be described in detail below with reference to the accompanying drawings showing embodiments thereof.

Hereinafter, each embodiment of the present invention will be described in detail with reference to the drawings. However, the configuration described in each embodiment below is merely an example, and the scope of the present invention is not limited by the configuration described in each embodiment. For example, each unit (each component) constituting the present invention can be replaced with a unit (a component) with any configuration that is capable of performing the same function. In addition, any components may be added. Furthermore, any two or more configurations (features) of each embodiment can be combined.

Figure 1A:
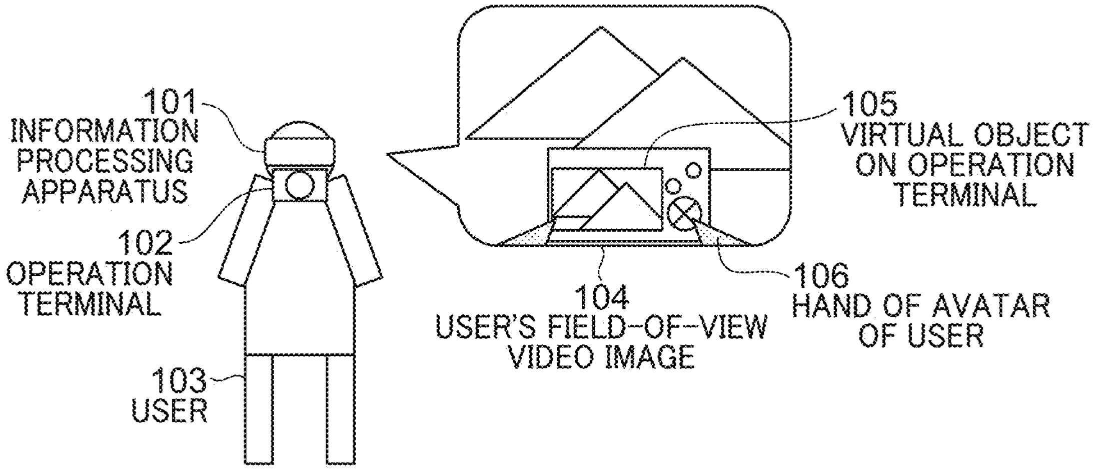
FIGS. 1A, 1B, and 1C are diagrams that show examples of a usage state of an information processing apparatus according to a first embodiment.
Figure 1B:
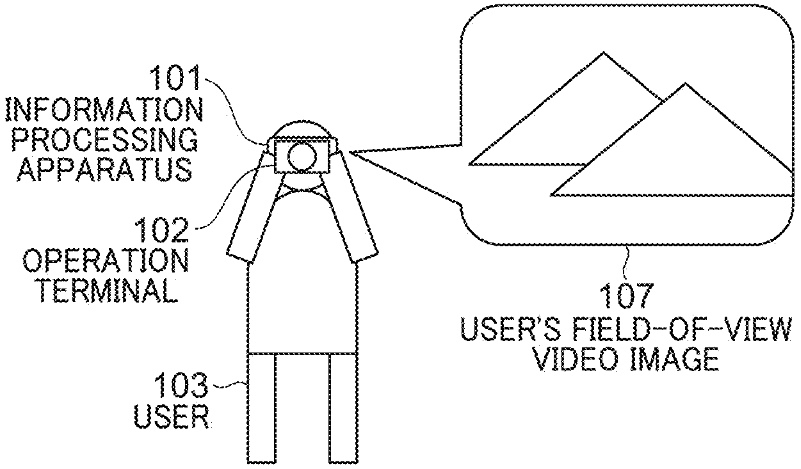
Figure 1C:
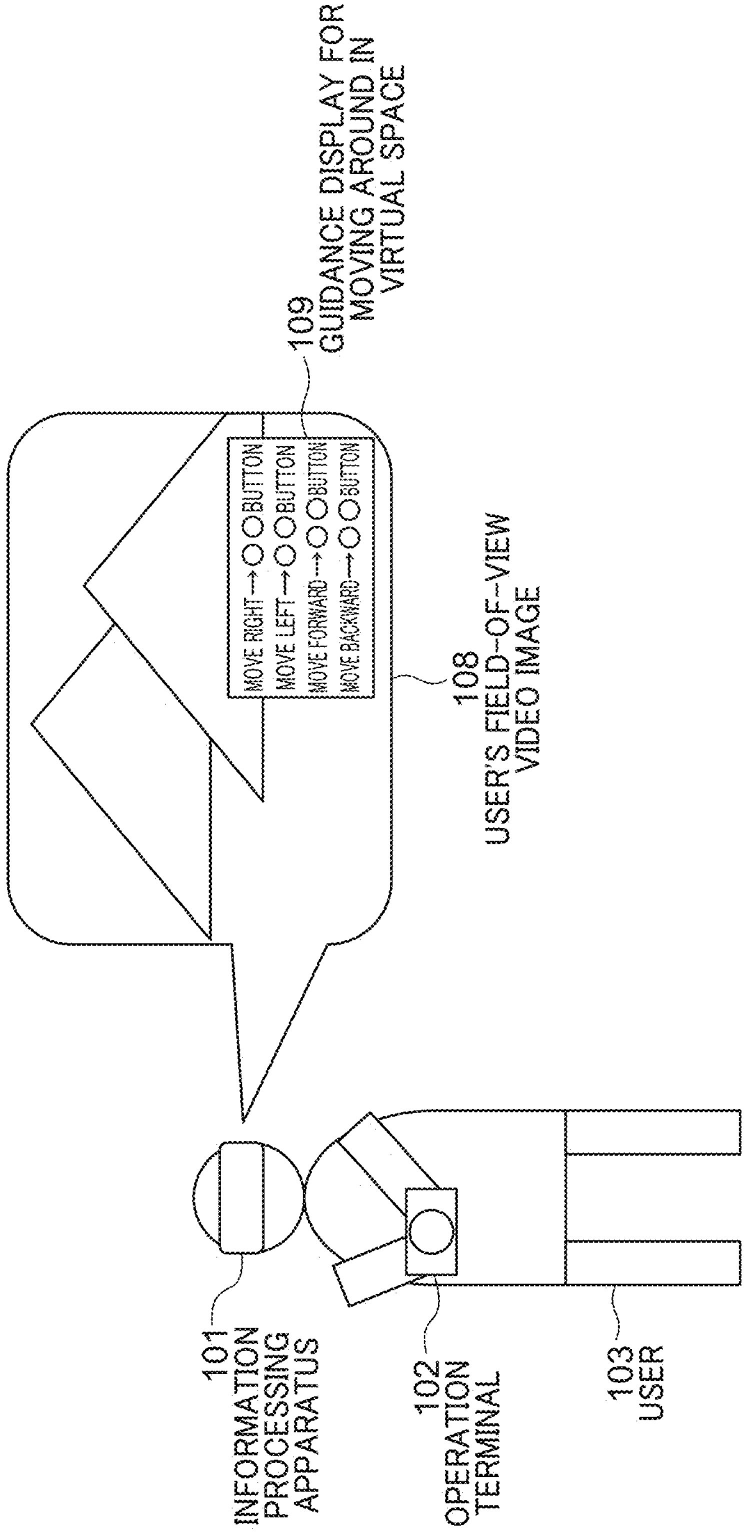

Hereinafter, a first embodiment of the present invention will be described with reference to FIGS. 1A to 6. FIGS. 1A, 1B, and 1C are diagrams that show examples of a usage state of an information processing apparatus according to the first embodiment. FIG. 1A is a diagram that shows a state in which an operation terminal is located within an angle of view of the information processing apparatus. FIG. 1B is a diagram that shows a state in which the operation terminal is located within the angle of view of the information processing apparatus and a user is looking into a finder of the operation terminal. FIG. 1C is a diagram that shows a state in which the operation terminal is located outside the angle of view of the information processing apparatus. An information processing apparatus 101 is a head mounted display (an HMD) that is mountably mounted on the head of a user 103. The information processing apparatus 101 is able to be used by being communicably connected to an operation terminal 102. Hereinafter, the state in which the information processing apparatus 101 and the operation terminal 102 are communicably connected to each other may be referred to as "a communication state". The operation terminal 102 is camera equipment such as a single-lens reflex camera or a mirrorless camera, and in the first embodiment, includes a finder photographing function and a live view photographing function. It should be noted that the operation terminal 102 is not limited to the camera equipment, and may be, for example, a smartphone or a mobile type controller. As shown in FIG. 1A, the user 103 wears the information processing apparatus 101 on his or her head (hereinafter, referred to as "a wearing state") and positions the operation terminal 102 in front of his or her eyes. At this time, the operation terminal 102 becomes in a state in which the operation terminal 102 is located within an angle of view of the information processing apparatus 101. As shown in FIG. 1B, the user 103 who is in the wearing state is looking into a finder of the operation terminal 102. At this time, the operation terminal 102 becomes in the state in which the operation terminal 102 is located within the angle of view of the information processing apparatus 101 and the user 103 is looking into the finder of the operation terminal 102. As shown in FIG. 1C, the user 103 who is in the wearing state positions the operation terminal 102 in front of his or her chest. At this time, the operation terminal 102 becomes in a state in which the operation terminal 102 is located outside the angle of view of the information processing apparatus 101.

Figure 2A:
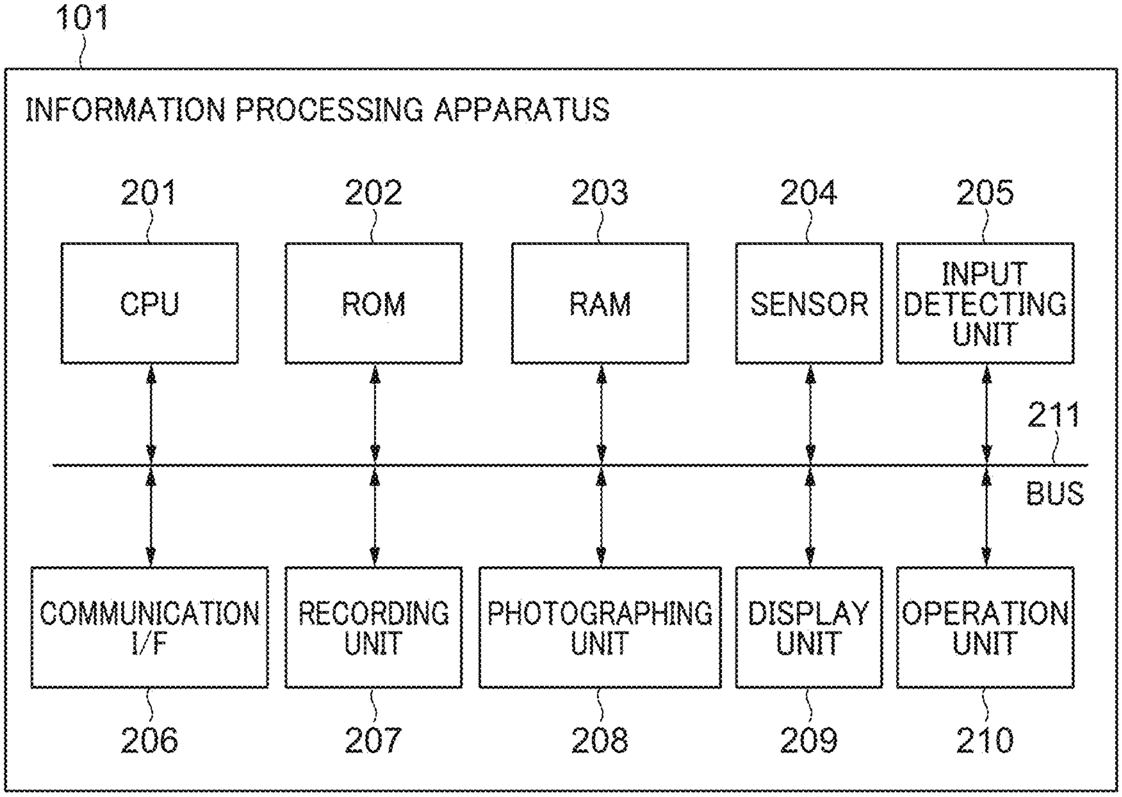
FIG. 2A is a block diagram that shows an example of a hardware configuration of the information processing apparatus.
Figure 2B:
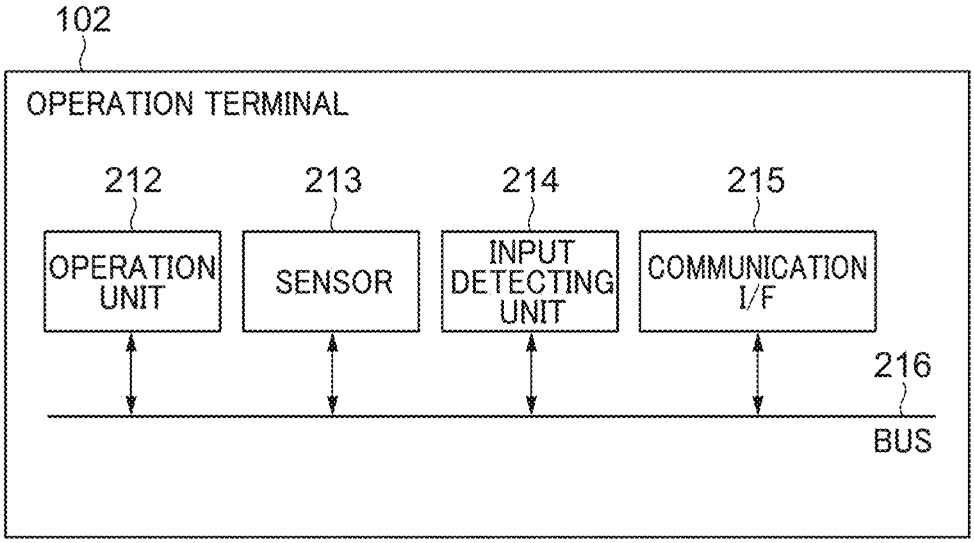
FIG. 2B is a block diagram that shows an example of a hardware configuration of an operation terminal.

FIG. 2A is a block diagram that shows an example of a hardware configuration of the information processing apparatus, and FIG. 2B is a block diagram that shows an example of a hardware configuration of the operation terminal. As shown in FIG. 2A, the information processing apparatus 101 includes a central processing unit (a CPU) 201, a read only memory (a ROM) 202, a random-access memory (a RAM) 203, a sensor 204, an input detecting unit 205, a communication interface (a communication I/F) 206, a recording unit 207, a photographing unit (an image pickup unit) 208, a display unit 209, and an operation unit 210. These pieces of hardware included in the information processing apparatus 101 are communicably connected to each other via a bus 211. The CPU 201 is a system control unit (a computer) that controls the entire information processing apparatus 101. The ROM 202 is a read only memory that stores programs and parameters that do not require change, such as basic programs and initial data. The RAM 203 is a memory for temporarily storing input information, calculation results in information processing and image processing, and the like. The sensor 204 detects a position and an attitude of the information processing apparatus 101. The sensor 204 is not particularly limited, and may be, for example, a gyro sensor. The input detecting unit 205 accepts input of required data. The required data is not particularly limited, and may be, for example, an operation or the like on an operation unit 212 of the operation terminal 102 received by the communication I/F 206. The communication I/F 206 is an interface unit capable of transmitting and receiving data to and from the operation terminal 102, a cloud, and the like. The connection forms of input/output by the communication I/F 206 include a local connection by a universal serial bus (USB), Bluetooth (registered trademark) or the like, an Internet connection by Ethernet or Wi-Fi (registered trademark), and the like.

The recording unit 207 is a device capable of writing and reading various types of information. The recording unit 207 is not particularly limited, and may be, for example, a hard disk or a memory card built into or external to the information processing apparatus 101, or a memory card, a removable disk, an IC card, or the like that is capable of being attached to or detached from the information processing apparatus 101. In addition, the recording unit 207 includes (stores) an information processing program for causing the CPU 201 to execute respective units and respective modules (a control method for the information processing apparatus) of the information processing apparatus 101. The information processing program is read out from the recording unit 207, is loaded into the RAM 203, and is executed by the CPU 201. It should be noted that the information processing program may be stored in the ROM 202. In addition, the recording unit 207 is capable of recording required data used by the information processing program. The photographing unit 208 is capable of photographing image(s). The photographing unit 208 is able to execute image recognition with respect to the photographed real video image and perform tracking of hand joints of the user 103 or a hand movement of the user 103. In addition, the photographing unit 208 picks up an image of the operation terminal 102 and detects a position of the operation terminal 102 based on the image picked up. The display unit 209 is a stereo display corresponding to both eyes of the user 103, and displays an image of a virtual space. The operation unit 210 controls input to the information processing apparatus 101. The operation unit 210 is not particularly limited, and examples thereof include a power button, a menu button, a selection button, and a decision button. It should be noted that in the case of reducing the size and the weight of the information processing apparatus 101, it is preferable to separate an information processing system, which includes the CPU 201, the ROM 202, the RAM 203, the sensor 204, the input detecting unit 205, the communication I/F 206, the recording unit 207, and the operation unit 210, from an image pickup and display system other than the information processing system. The information processing system has been disposed as an external component (an external configuration), and the image pickup and display system has been built into the information processing apparatus 101.

As shown in FIG. 2B, the operation terminal 102 includes the operation unit (an input unit) 212, a sensor 213, an input detecting unit 214, and a communication I/F 215. These pieces of hardware included in the operation terminal 102 are communicably connected to each other via a bus 216. The operation terminal 102 is provided with a plurality of operation units 212, and each operation unit 212 is configured with any one of a mechanical button, a mechanical dial, a touch panel, and a touch pad. Furthermore, by operating the operation unit 212, operation instructions, commands, etc. from the user 103 are obtained. In addition, by operating each operation unit 212 in the communication state, a desired input operation is performed with respect to the image of the virtual space displayed on the display unit 209 of the information processing apparatus 101. By this input operation, a specified function is performed.

For example, in the state shown in FIG. 1A, a field-of-view video image 104 similar to what the user 103 sees in the real space is displayed on the display unit 209 of the information processing apparatus 101. The field-of-view video image 104 includes a virtual object 105 of the operation terminal 102 that corresponds to the position, an attitude, and an appearance of the operation terminal 102 held in (gripped by) the hand of the user 103 in the real space. In addition, in this state, when the user 103 releases a shutter of the operation terminal 102, it is possible to perform photographing of a photograph or a video image (a moving image) of the virtual space according to a position of the virtual object 105. In the case that body tracking is performed by the information processing apparatus 101, a hand 106 of an avatar of the user 103 is displayed in the field-of-view video image 104 without any sense of incongruity, so that the user 103 feels as if he or she is holding the operation terminal 102 in the virtual space. Furthermore, the user 103 is able to perform the change of various kinds of settings such as photographing conditions on the touch panel of the operation terminal 102. In the state shown in FIG. 1B, when the user 103 releases the shutter of the operation terminal 102, it is possible to perform photographing of a photograph or a video image (a moving image) of the virtual space. The field-of-view video image 104 is displayed in full screen as if the field-of-view video image 104 is being photographed by looking through the finder. In the state shown in FIG. 1C, the user 103 is able to move within the virtual space by operating the operation unit 212 of the operation terminal 102. A field-of-view video image 108 includes a guidance display 109 for moving within the virtual space. The guidance display 109 indicates the operation content within the virtual space when the user 103 operates the operation unit 212 of the operation terminal 102 held by the user 103. In this manner, with the information processing apparatus 101, it is possible to perform allocation of the function to an input from the operation terminal 102 depending on the position of the operation terminal 102.

It should be noted that the operation terminal 102 is not limited to including the plurality of operation units 212, but may include at least one operation unit 212. The sensor 213 obtains the position and the attitude of the operation terminal 102 and obtains changes in the position and the attitude of the operation terminal 102. The sensor 213 is not particularly limited, and may be, for example, an acceleration sensor. The input detecting unit 214 accepts input of required data. The required data is not particularly limited, and may be, for example, an instruction or the like issued by an operation on the operation unit 212. The communication I/F 215 is an interface unit capable of transmitting and receiving data to and from the information processing apparatus 101. The connection forms of input/output by the communication I/F 215 include a local connection by a universal serial bus (USB), Bluetooth or the like, an Internet connection by Ethernet or Wi-Fi, and the like.

Figure 3:
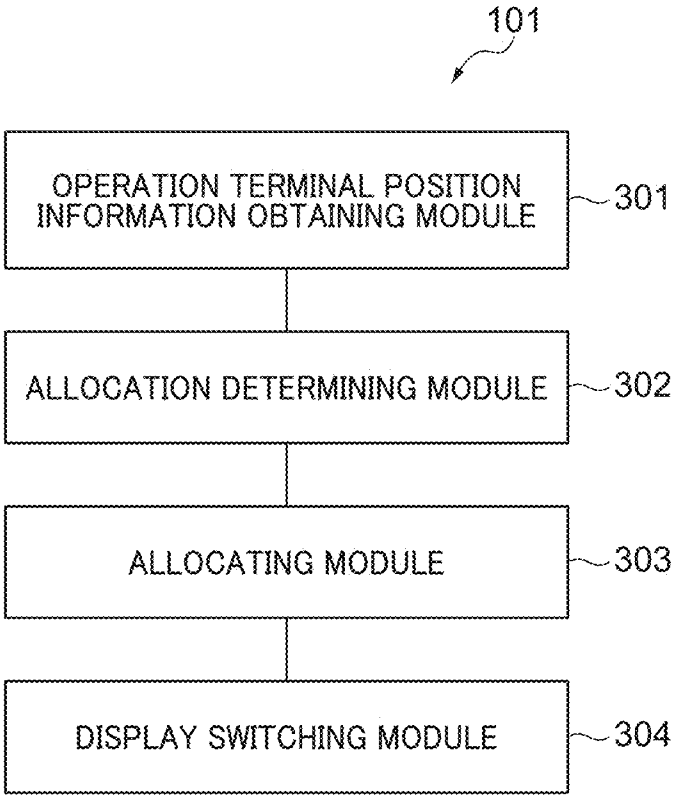
FIG. 3 is a block diagram that shows an example of a software configuration (a functional configuration) of the information processing apparatus.

FIG. 3 is a block diagram that shows an example of a software configuration (a functional configuration) of the information processing apparatus. As shown in FIG. 3, the information processing apparatus 101 includes an operation terminal position information obtaining module 301, an allocation determining module 302, an allocating module 303, and a display switching module 304. The operation terminal position information obtaining module 301 (a position obtaining unit) obtains position information relating to the position of the operation terminal 102 (a position obtaining step). In the first embodiment, the operation terminal position information obtaining module 301 is able to obtain the position information of the operation terminal 102 by applying an image recognition processing to an image photographed by the photographing unit 208 of the information processing apparatus 101. In addition, the operation terminal position information obtaining module 301 is also able to obtain the position information of the operation terminal 102 from the sensor 213 of the operation terminal 102. In addition, by applying the image recognition processing to the image photographed by the photographing unit 208 of the information processing apparatus 101, the operation terminal position information obtaining module 301 is able to determine whether or not the operation terminal 102 is present within the angle of view of the photographing unit 208, that is, is able to determine the position of the operation terminal 102. FIG. 4 is a diagram that shows an example of data obtained by the operation terminal position information obtaining module of the information processing apparatus. As shown in FIG. 4, the data obtained by the operation terminal position information obtaining module includes the position information of the operation terminal 102 and whether-or-not-within-the-angle-of-view information which indicates that whether or not the operation terminal 102 is located within the angle of view of the photographing unit 208 of the information processing apparatus 101 that is the HMD. The position information of the operation terminal 102 is expressed as (x, y, z) with a position of the photographing unit 208 as a reference point. As a result, it is possible to obtain a distance between the operation terminal 102 and the photographing unit 208 (the information processing apparatus 101). It should be noted that x and y are positions in horizontal directions, and z is a position in a vertical direction. In FIG. 4, as an example, (x, y, z)=(0, 100, 100). The whether-or-not-within-the-angle-of-view information is indicated by "O" which indicates that the operation terminal 102 is located within the angle of view, or by "X" which indicates that the operation terminal 102 is not located within the angle of view. In FIG. 4, as an example, the whether-or-not-within-the-angle-of-view information is indicated by "O". It should be noted that the whether-or-not-within-the-angle-of-view information is also capable of being included in the position information of the operation terminal 102 as part of the position information of the operation terminal 102.

Depending on the position information of the operation terminal 102, the allocation determining module 302 is able to determine whether or not to change the function of the operation unit 212 that is performed by an input operation on the operation unit 212, that is, is able to determine which function is to be allocated to the operation unit 212 (a changing step). In the first embodiment, the allocation determining module 302 determines which function is to be allocated to the operation unit 212 in response to a length of the distance between the operation terminal 102 and the information processing apparatus 101 and the presence or absence of the operation terminal 102 within the angle of view of the photographing unit 208.

The allocating module 303 allocates (changes) functions to the operation unit 212 in accordance with a determination result obtained by the allocation determining module 302. It should be noted that in the first embodiment, the allocation determining module 302 and the allocating module 303 (that function as a changing unit) are separate components, but are not limited to this and may be one component (an allocation and change module). FIGS. 5A, 5B, and 5C are diagrams that show examples of allocation of the functions to the operation unit of the operation terminal according to the determination result obtained by the allocation determining module of the information processing apparatus. FIG. 5A is a diagram that shows an example of function allocation for photographing (for the finder photographing function). FIG. 5B is a diagram that shows an example of function allocation for live view photographing (for the live view photographing function). FIG. 5C is a diagram that shows an example of function allocation for moving an angle (for moving within the virtual space). In the case that the operation terminal 102 is located within the angle of view of the photographing unit 208 and the distance between the operation terminal 102 and the information processing apparatus 101 is equal to or smaller than a threshold value (see FIG. 1B), the functions of the operation unit 212 serving as the input unit are set to the function allocation for photographing shown in FIG. 5A. As shown in FIG. 5A, the operation unit 212 includes a button A, a button B, a dial A, and the like. When the button A is operated, a function for performing the same photographing as photographing by looking through the finder is allocated to the button A. Furthermore, when the button B is operated, a function for performing zooming when performing photographing is allocated to the button B. In addition, when the dial A is operated, a function for performing setting change that changes the settings such as the photographing conditions is allocated to the dial A.

In the case that the operation terminal 102 is located within the angle of view of the photographing unit 208 and the distance between the operation terminal 102 and the information processing apparatus 101 is not equal to or smaller than the threshold value (see FIG. 1A), the functions of the operation unit 212 are set to the function allocation for live view photographing shown in FIG. 5B. As shown in FIG. 5B, the operation unit 212 includes a button A, a button B, a dial A, a touch panel, and the like. When the button A is operated, a function for performing live view photographing is allocated to the button A. Furthermore, when the button B is operated, a function for performing zooming when performing live view photographing is allocated to the button B. In addition, when the dial A is operated, a function for performing setting change that changes the settings such as live view photographing conditions is allocated to the dial A. In addition, when the touch panel is operated, the function for performing live view photographing is allocated to the touch panel.

In the case that the operation terminal 102 is not located within the angle of view of the photographing unit 208 (see FIG. 1C), the functions of the operation unit 212 are set to the function allocation for moving the angle shown in FIG. 5C. As shown in FIG. 5C, the operation unit 212 includes a button A, a button B, a dial A, and the like. When the button A is operated, a function for performing moving right is allocated to the button A. Furthermore, when the button B is operated, a function for performing moving left is allocated to the button B. In addition, when the dial A is operated, a function for performing orientation change that changes an orientation is allocated to the dial A.

The display switching module 304 switches the display content on the display unit 209 in accordance with the function allocation performed by the allocating module 303. As shown in FIG. 1A, in the case of the function allocation for live view photographing, the virtual object 105 of the operation terminal 102 picked up by the photographing unit 208 is displayed on the image of the virtual space that is the background. Furthermore, as shown in FIG. 1B, in the case of the function allocation for photographing, the image of the virtual space that is the background (a field-of-view video image 107) is displayed. In addition, as shown in FIG. 1C, in the case of the function allocation for moving the angle, the operation unit 212, and the functions of the operation unit 212 (the moving guidance) set or changed by the allocating module 303 are displayed on the image of the virtual space that is the background.

Figure 6:
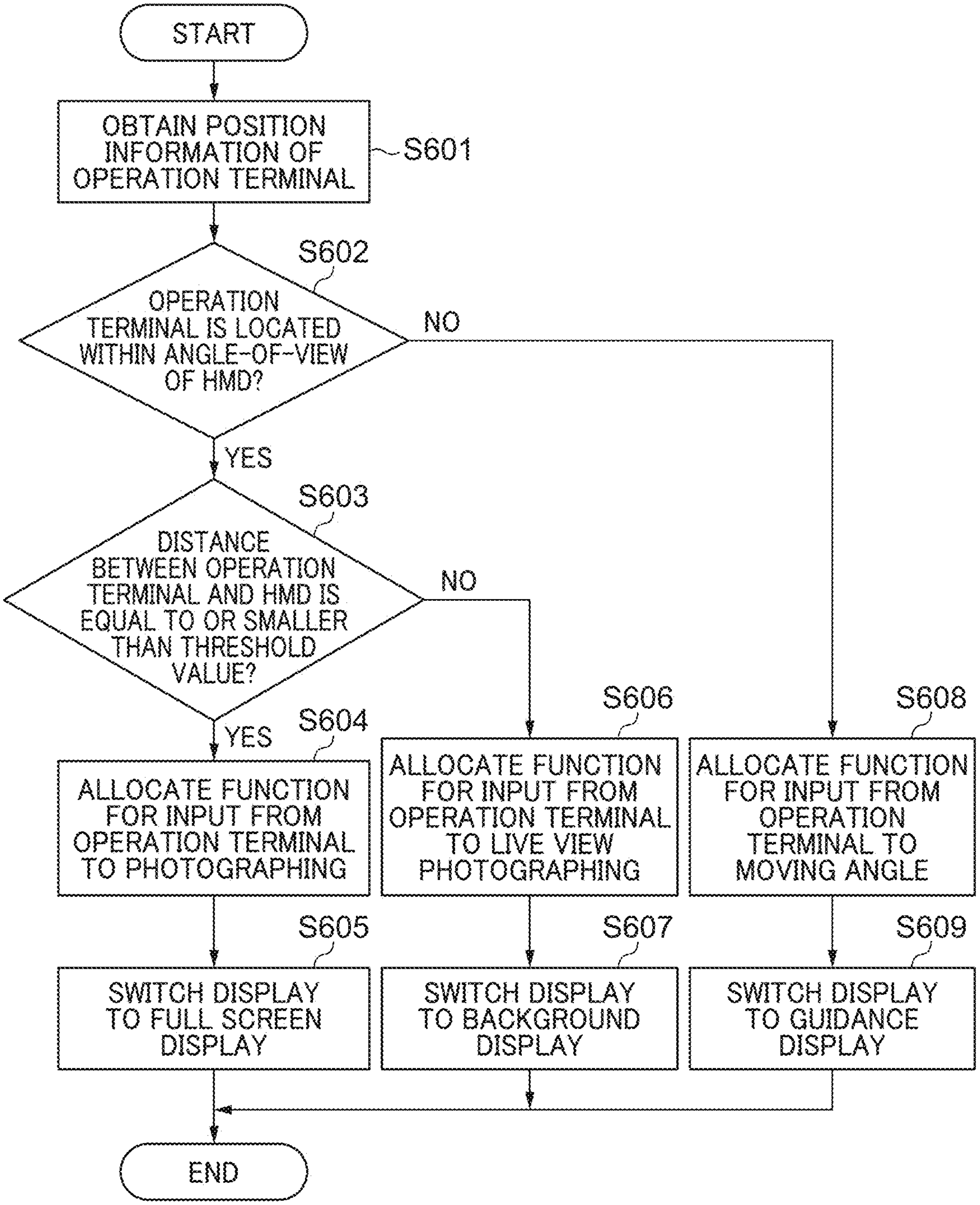
FIG. 6 is a flowchart that shows a processing executed by the information processing apparatus.

FIG. 6 is a flowchart that shows a processing executed by the information processing apparatus. As shown in FIG. 6, in a step S601, the operation terminal position information obtaining module 301 obtains the position information of the operation terminal 102.

In a step S602, the allocation determining module 302 determines (judges) whether or not the operation terminal 102 is located within the angle of view of the photographing unit 208 based on the position information of the operation terminal 102 obtained in the step S601. As a result of the determination in the step S602, in the case of being determined that the operation terminal 102 is located within the angle of view of the photographing unit 208, the processing shown in FIG. 6 proceeds to a step S603. On the other hand, as the result of the determination in the step S602, in the case of being determined that the operation terminal 102 is not located within the angle of view of the photographing unit 208, the processing shown in FIG. 6 proceeds to a step S608.

In the step S603, the allocation determining module 302 determines whether or not the distance between the operation terminal 102 and the photographing unit 208 is equal to or smaller than the threshold value based on the position information of the operation terminal 102 obtained in the step S601. As a result of the determination in the step S603, in the case of being determined that the distance between the operation terminal 102 and the photographing unit 208 is equal to or smaller than the threshold value, the processing shown in FIG. 6 proceeds to a step S604. On the other hand, as the result of the determination in the step S603, in the case of being determined that the distance between the operation terminal 102 and the photographing unit 208 is not equal to or smaller than the threshold value, the processing shown in FIG. 6 proceeds to a step S606. It should be noted that the threshold value is preferably set in advance, and may be changeable as appropriate.

In the step S604, the allocating module 303 sets the allocation of the functions to the operation unit 212 of the operation terminal 102 to the function allocation for photographing shown in FIG. 5A.

In a step S605, the display switching module 304 switches the display content on the display unit 209 to the field-of-view video image 107 (see FIG. 1B). The field-of-view video image 107 is displayed in full screen. After the step S605 is executed, the processing shown in FIG. 6 ends.

In the step S606, the allocating module 303 sets the allocation of the functions to the operation unit 212 of the operation terminal 102 to the function allocation for live view photographing shown in FIG. 5B.

In a step S607, the display switching module 304 switches the display content on the display unit 209 to the field-of-view video image 104 (see FIG. 1A). The field-of-view video image 104 includes the background image. After the step S607 is executed, the processing shown in FIG. 6 ends.

In the step S608, the allocating module 303 sets the allocation of the functions to the operation unit 212 of the operation terminal 102 to the function allocation for moving the angle shown in FIG. 5C.

In a step S609, the display switching module 304 switches the display content on the display unit 209 to the field-of-view video image 108 (see FIG. 1C). The field-of-view video image 108 includes the guidance display 109 for moving within the virtual space. After the step S609 is executed, the processing shown in FIG. 6 ends.

With the information processing apparatus 101 having the above configuration, it is possible to smoothly allocate the function intended by the user 103 to the operation terminal 102 according to the position of the operation terminal 102 relative to the user 103 while the operation terminal 102 remains in a state where it is capable of being used for photographing. In other words, it is possible to cause one operation terminal 102 to perform a variety of functions without the user 103 having to switch from the operation terminal 102 to another operation terminal. As a result, the user 103 is able to operate the operation terminal 102 while holding it, for example, to photograph an image and change the position of the user's own avatar in the virtual space.

Hereinafter, a second embodiment of the present invention will be described with reference to FIG. 7 and FIG. 8, focusing on the differences from the first embodiment described above, and the descriptions of similar matters will be omitted. The second embodiment is similar to the first embodiment described above, except that the functions to the operation unit 212 of the operation terminal 102 are allocated in accordance with a line of sight of the user 103.

Figure 7:
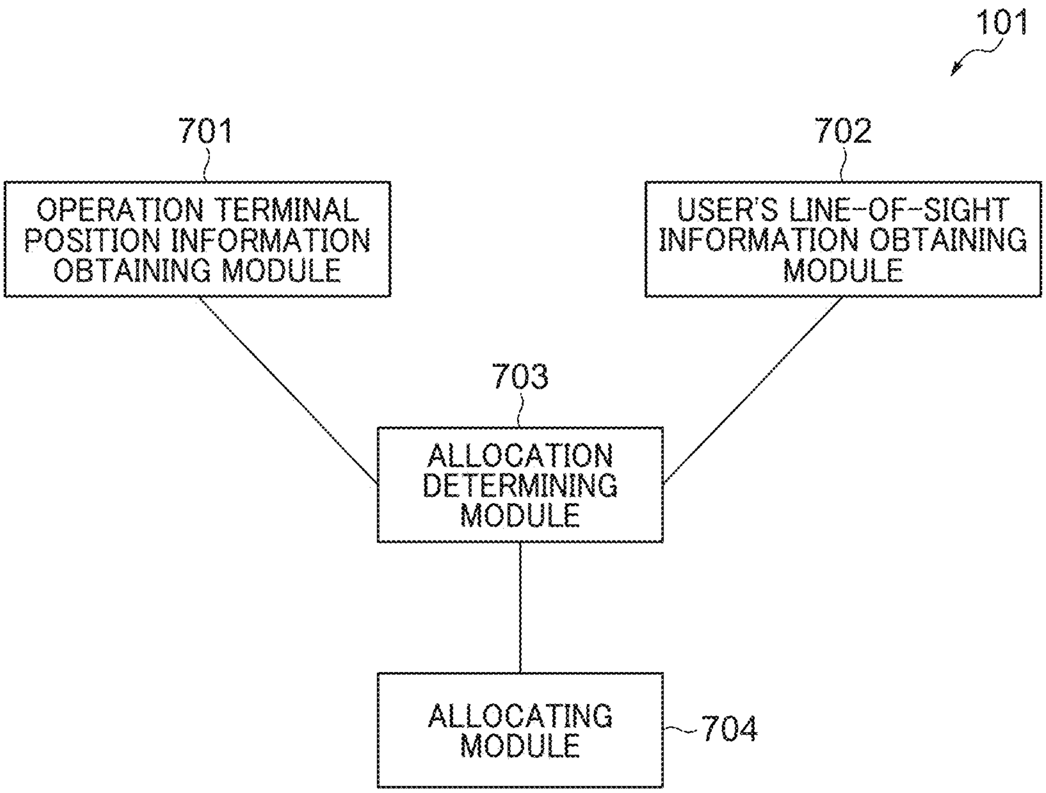
FIG. 7 is a block diagram that shows an example of a software configuration (a functional configuration) of an information processing apparatus according to a second embodiment.

FIG. 7 is a block diagram that shows an example of a software configuration (a functional configuration) of an information processing apparatus according to the second embodiment. As shown in FIG. 7, an information processing apparatus 101 includes an operation terminal position information obtaining module 701, a user's line-of-sight information obtaining module (a line-of-sight obtaining unit) 702, an allocation determining module 703, and an allocating module 704. Similar to the operation terminal position information obtaining module 301, the operation terminal position information obtaining module 701 (the position obtaining unit) obtains position information relating to the position of the operation terminal 102. The user's line-of-sight information obtaining module 702 obtains line-of-sight information relating to a line of sight of the user 103 who is in the wearing state and operates the operation terminal 102. The method of obtaining the line-of-sight information is not particularly limited, and examples thereof include eye tracking, which detects (tracks) the movement of the user's eyeball by using a camera or an infrared sensor built into the information processing apparatus 101 and uses the detection result. The allocation determining module 703 determines which function is to be allocated to the operation unit 212 in accordance with the position information of the operation terminal 102 and the line-of-sight information of the user 103. In the second embodiment, the allocation determining module 703 determines which function is to be allocated to the operation unit 212 in accordance with the presence or absence of the operation terminal 102 within the angle of view of the photographing unit 208 and the presence or absence of the operation terminal 102 in a line-of-sight direction of the user 103. The allocating module 704 allocates functions to the operation unit 212 in accordance with a determination result obtained by the allocation determining module 703. In the second embodiment, in the case that the operation terminal 102 is located within the angle of view of the photographing unit 208 and the operation terminal 102 is located in the line-of-sight direction of the user 103, the allocating module 704 sets the allocation of the functions to the operation unit 212 of the operation terminal 102 to the function allocation for photographing shown in FIG. 5A. In addition, in the case that the operation terminal 102 is located within the angle of view of the photographing unit 208 and the operation terminal 102 is not located in the line-of-sight direction of the user 103, the allocating module 704 sets the allocation of the functions to the operation unit 212 of the operation terminal 102 to the function allocation for moving the angle shown in FIG. 5C.

Figure 8:
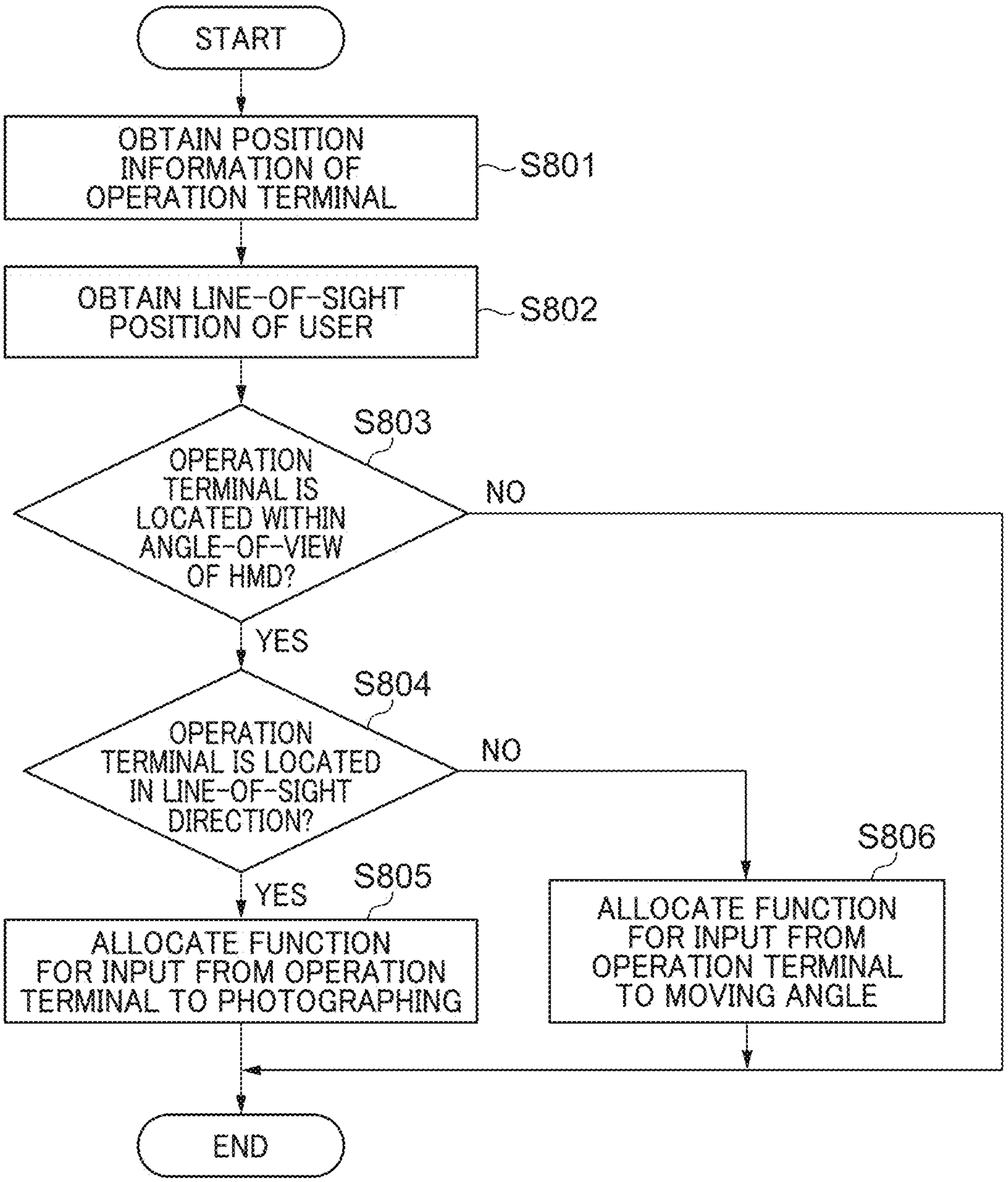
FIG. 8 is a flowchart that shows a processing executed by the information processing apparatus according to the second embodiment.

FIG. 8 is a flowchart that shows a processing executed by the information processing apparatus according to the second embodiment. As shown in FIG. 8, in a step S801, the operation terminal position information obtaining module 701 obtains the position information of the operation terminal 102.

In a step S802, the user's line-of-sight information obtaining module 702 obtains the line-of-sight information (a line-of-sight position) of the user 103.

In a step S803, the allocation determining module 703 determines whether or not the operation terminal 102 is located within the angle of view of the photographing unit 208 based on the position information of the operation terminal 102 obtained in the step S801. As a result of the determination in the step S803, in the case of being determined that the operation terminal 102 is located within the angle of view of the photographing unit 208, the processing shown in FIG. 8 proceeds to a step S804. On the other hand, as the result of the determination in the step S803, in the case of being determined that the operation terminal 102 is not located within the angle of view of the photographing unit 208, the processing shown in FIG. 8 ends.

In the step S804, the allocation determining module 703 determines whether or not the operation terminal 102 is located in the line-of-sight direction of the user 103 (the operation terminal 102 is located ahead of the line of sight of the user 103). This determination is made based on the position information of the operation terminal 102 obtained in the step S801 and the line-of-sight information of the user 103 obtained in the step S802. Then, as a result of the determination in the step S804, in the case of being determined that the operation terminal 102 is located in the line-of-sight direction of the user 103, the processing shown in FIG. 8 proceeds to a step S805. On the other hand, as the result of the determination in the step S804, in the case of being determined that the operation terminal 102 is not located in the line-of-sight direction of the user 103, the processing shown in FIG. 8 proceeds to a step S806.

In the step S805, the allocating module 704 sets the allocation of the functions to the operation unit 212 of the operation terminal 102 to the function allocation for photographing shown in FIG. 5A.

In the step S806, the allocating module 704 sets the allocation of the functions to the operation unit 212 of the operation terminal 102 to the function allocation for moving the angle shown in FIG. 5C.

As described above, in the second embodiment, the information processing apparatus 101 is able to change the functions of the operation unit 212 in accordance with the position information of the operation terminal 102 and the line-of-sight information of the user 103. As a result, it is possible to more smoothly allocate the function intended by the user 103 to the operation terminal 102, thereby improving the usability of the operation terminal 102.

Although the preferred embodiments of the present invention have been described above, the present invention is not limited to the above-described embodiments, and various modifications and changes are possible within the scope of the gist of the present invention. The information processing apparatus 101 is not limited to a configuration in which the CPU 201, the ROM 202, the RAM 203, the sensor 204, the input detecting unit 205, the communication I/F 206, the recording unit 207, the photographing unit 208, the display unit 209, and the operation unit 210 are incorporated into a single device, that is, a configuration in which the information processing apparatus 101 is formed as a unit. For example, the CPU 201, the ROM 202, and the RAM 203 may be configured as one unit (one server), and the sensor 204, the input detecting unit 205, the communication I/F 206, the recording unit 207, the photographing unit 208, the display unit 209, and the operation unit 210 may be configured as one unit. In addition, the information processing apparatus 101 may include a switching module (a switching unit) capable of switching between a plurality of operation modes of the information processing apparatus 101 within the image of the virtual space. The operation modes are not particularly limited, and examples thereof include a mode suitable for moving in a dark environment. Furthermore, with the display unit 209, it is possible to change the image of the virtual space to an image including a guidance, an assistance message, or the like in accordance with each operation mode. As a result, the usability of the information processing apparatus 101 is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-155922, filed on Sep. 21, 2023, which is hereby incorporated by reference herein in its entirety.

What is claimed is:

1. An information processing apparatus communicably connected to an operation terminal including an input unit that performs an input operation for an image of a virtual space and performs a specified function in response to the input operation, wherein a camera including a finder photographing function and a live view photographing function is used as the operation terminal, the information processing apparatus comprising:

an image pickup unit configured to pick up an image of the operation terminal; and one or more processors and/or circuitry configured to:

execute a position obtaining processing that obtains position information relating to a position of the operation terminal, the position information including a position of the operation terminal within an angle of view of the image pickup unit; and execute a changing processing that is capable of changing the function of the input unit to be performed by the input operation in accordance with the position information obtained in the position obtaining processing, wherein in the changing processing, in a case that the position of the operation terminal is within the angle of view of the image pickup unit, the function of the input unit is changed so as to be used for the finder photographing function or the live view photographing function, and in a case that the position of the operation terminal is not within the angle of view of the image pickup unit, the function of the input unit is changed so as to be used for moving within the virtual space.

2. The information processing apparatus according to claim 1, wherein the operation terminal includes a plurality of the input units, and at least one of the plurality of the input units is configured with a mechanical button, a mechanical dial, a touch panel, and a touch pad.

3. The information processing apparatus according to claim 1, wherein the one or more processors and/or circuitry is further configured to execute a line-of-sight obtaining processing that obtains line-of-sight information relating to a line of sight of a user operating the operation terminal, and in the changing processing, the function of the input unit is capable of being changed in accordance with the position information, and the line-of-sight information obtained in the line-of-sight obtaining processing.

4. The information processing apparatus according to claim 3, wherein in the changing processing, in a case that the line-of-sight information indicating that the operation terminal is located ahead of the line of sight of the user has been obtained, the function of the input unit is changed so as to be used for the finder photographing function, and in a case that the line-of-sight information indicating that the operation terminal is not located ahead of the line of sight of the user has been obtained, the function of the input unit is changed so as to be used for moving within the virtual space.

5. The information processing apparatus according to claim 1, further comprising:

a display unit configured to display the image of the virtual space.

6. The information processing apparatus according to claim 5, wherein the one or more processors and/or circuitry is further configured to execute a switching processing that is capable of switching between a plurality of operation modes of the information processing apparatus within the image of the virtual space, and the display unit changes the image of the virtual space to an image corresponding to each of the operation modes.

7. The information processing apparatus according to claim 5, wherein the display unit is capable of displaying a virtual object of the operation terminal picked up by the image pickup unit on the image of the virtual space.

8. The information processing apparatus according to claim 5, wherein the display unit is capable of displaying the function of the input unit that has been changed in the changing processing on the image of the virtual space.

9. The information processing apparatus according to claim 5, wherein the information processing apparatus is a head mounted display.

10. An information processing apparatus communicably connected to an operation terminal including an input unit that performs an input operation for an image of a virtual space and performs a specified function in response to the input operation, wherein a camera including a finder photographing function and a live view photographing function is used as the operation terminal, the information processing apparatus comprising one or more processors and/or circuitry configured to:

execute a position obtaining processing that obtains position information relating to a position of the operation terminal, the position information including a distance between the operation terminal and the information processing apparatus; and execute a changing processing that is capable of changing the function of the input unit to be performed by the input operation in accordance with the position information obtained in the position obtaining processing, wherein in the changing processing, in a case that the distance is equal to or smaller than a threshold value, the function of the input unit is changed so as to be used for the finder photographing function, and in a case that the distance is not equal to or smaller than the threshold value, the function of the input unit is changed so as to be used for the live view photographing function.

11. The information processing apparatus according to claim 10, further comprising:

an image pickup unit configured to pick up an image of the operation terminal, and wherein in the position obtaining processing, a position of the operation terminal within an angle of view of the image pickup unit is obtained as the position information, and in the changing processing, the function of the input unit is capable of being changed in accordance with the position of the operation terminal within the angle of view of the image pickup unit.

12. The information processing apparatus according to claim 11, wherein in the changing processing, in a case that the position of the operation terminal is within the angle of view of the image pickup unit, the function of the input unit is changed so as to be used for the finder photographing function or the live view photographing function, and in a case that the position of the operation terminal is not within the angle of view of the image pickup unit, the function of the input unit is changed so as to be used for moving within the virtual space.

13. A control method for controlling an information processing apparatus communicably connected to an operation terminal including an input unit that performs an input operation for an image of a virtual space and performs a specified function in response to the input operation, wherein a camera includes a finder photographing function and a live view photographing function is used as the operation terminal, the control method comprising:

picking up an image of the operation terminal by an image pickup unit;

a position obtaining step of obtaining position information relating to a position of the operation terminal, the position information including a position of the operation terminal within an angle of view of the image pickup unit; and a changing step of being capable of changing the function of the input unit to be performed by the input operation in accordance with the position information obtained in the position obtaining step, wherein in the changing step, in a case that the position of the operation terminal is within the angle of view of the image pickup unit, the function of the input unit is changed so as to be used for the finder photographing function or the live view photographing function, and in a case that the position of the operation terminal is not within the angle of view of the image pickup unit, the function of the input unit is changed so as to be used for moving within the virtual space.

14. A non-transitory computer-readable storage medium storing a program for causing a computer to execute a control method for controlling an information processing apparatus communicably connected to an operation terminal including an input unit that performs an input operation for an image of a virtual space and performs a specified function in response to the input operation, wherein a camera includes a finder photographing function and a live view photographing function is used as the operation terminal, the control method comprising:

picking up an image of the operation terminal by an image pickup unit;

a position obtaining step of obtaining position information relating to a position of the operation terminal, the position information including a position of the operation terminal within an angle of view of the image pickup unit; and a changing step of being capable of changing the function of the input unit to be performed by the input operation in accordance with the position information obtained in the position obtaining step, wherein in the changing step, in a case that the position of the operation terminal is within the angle of view of the image pickup unit, the function of the input unit is changed so as to be used for the finder photographing function or the live view photographing function, and in a case that the position of the operation terminal is not within the angle of view of the image pickup unit, the function of the input unit is changed so as to be used for moving within the virtual space.

* * * * *